United States Patent
Edgell, II (10) Patent No.: US 11,247,926 B2
(45) Date of Patent: Feb. 15, 2022

(54) SYSTEM AND METHOD TO REMOVE MICRO PLASTIC MATERIAL FROM WATER ENVIRONMENTS

(71) Applicant: Richard L. Edgell, II, Potomac, MD (US)

(72) Inventor: Richard L. Edgell, II, Potomac, MD (US)

( * ) Notice: Subject to any disclaimer, the term of this patent is extended or adjusted under 35 U.S.C. 154(b) by 389 days.

(21) Appl. No.: 16/459,305

(22) Filed: Jul. 1, 2019

(65) Prior Publication Data

US 2020/0002208 A1    Jan. 2, 2020

Related U.S. Application Data

(60) Provisional application No. 62/693,361, filed on Jul. 2, 2018.

(51) Int. Cl.
| | |
|---|---|
| *C02F 1/24* | (2006.01) |
| *C02F 11/06* | (2006.01) |
| *C02F 9/02* | (2006.01) |
| *C02F 1/78* | (2006.01) |
| *C02F 9/00* | (2006.01) |
| *B01D 21/00* | (2006.01) |
| *B01D 21/28* | (2006.01) |
| *B01D 36/04* | (2006.01) |
| *B01D 29/64* | (2006.01) |

(Continued)

(52) U.S. Cl.
CPC ............ *C02F 9/00* (2013.01); *B01D 21/0012* (2013.01); *B01D 21/0027* (2013.01); *B01D 21/0084* (2013.01); *B01D 21/283* (2013.01); *B01D 29/6469* (2013.01); *B01D 36/04* (2013.01); *B63B 59/06* (2013.01); *B03D 1/1406* (2013.01); *B03D 1/1481* (2013.01); *C02F 1/004* (2013.01); *C02F 1/24* (2013.01); *C02F 1/34* (2013.01); *C02F 1/78* (2013.01); *C02F 11/06* (2013.01); *C02F 2101/30* (2013.01); *C02F 2103/007* (2013.01); *C02F 2103/08* (2013.01); *C02F 2201/008* (2013.01); *C02F 2303/04* (2013.01); *C02F 2303/16* (2013.01); *C02F 2303/26* (2013.01)

(58) Field of Classification Search
CPC ...... C02F 9/00; C02F 1/24; C02F 1/34; C02F 1/78; C02F 2303/04; C02F 2101/30; C02F 2103/007; C02F 2013/08; C02F 2201/008; C02F 2303/16; C02F 2303/26; C02F 11/06; B03D 1/1406; B03D 1/1481; B01D 21/0027; B01D 21/0012; B01D 21/283; B01D 36/04; B01D 21/0084; B63B 59/06
USPC .... 210/703, 806, 768, 202, 205, 206, 221.1, 210/221.2, 760; 241/24.11
See application file for complete search history.

(56) References Cited

U.S. PATENT DOCUMENTS

| | | | | |
|---|---|---|---|---|
| 3,630,400 A | * | 12/1971 | De Koning | B63B 27/24 406/38 |
| 3,961,758 A | * | 6/1976 | Morgan | F04D 7/045 241/46.11 |

(Continued)

FOREIGN PATENT DOCUMENTS

| | | | |
|---|---|---|---|
| CN | 106179773 A | * | 12/2016 |
| RU | 2653661 C1 | * | 5/2018 |
| WO | WO 2016/175985 A1 | * | 11/2016 |

*Primary Examiner* — Thomas M Lithgow
(74) *Attorney, Agent, or Firm* — Carmichael IP, PLLC (57) ABSTRACT

Some implementations can include method and system to collect and remove micro plastics from a water environment or ecosystem.

20 Claims, 5 Drawing Sheets

(51) Int. Cl.
  *B63B 59/06*  (2006.01)
  *C02F 1/00*  (2006.01)
  *C02F 1/34*  (2006.01)
  *C02F 101/30*  (2006.01)
  *C02F 103/00*  (2006.01)
  *C02F 103/08*  (2006.01)
  *B03D 1/14*  (2006.01)

(56) References Cited

U.S. PATENT DOCUMENTS

| | | | | |
|---|---|---|---|---|
| 4,543,183 | A * | 9/1985 | Petretti | E03F 7/103 |
| | | | | 210/187 |
| 5,234,110 | A * | 8/1993 | Kobler | B03D 1/008 |
| | | | | 209/166 |
| 5,377,844 | A * | 1/1995 | Hwang | B03D 1/016 |
| | | | | 241/16 |
| 5,399,433 | A * | 3/1995 | Kobler | B03D 1/014 |
| | | | | 428/407 |
| 8,871,086 | B2 * | 10/2014 | Hardison | B01D 21/34 |
| | | | | 210/109 |
| 10,988,392 | B2 * | 4/2021 | Piironen | C02F 1/5272 |
| 11,034,592 | B1 * | 6/2021 | McDonagh | G05B 13/0265 |
| 2013/0292305 | A1 * | 11/2013 | Shelby | C09D 7/63 |
| | | | | 209/162 |
| 2016/0114865 | A1 * | 4/2016 | Covington | E02B 15/047 |
| | | | | 210/747.6 |
| 2021/0070638 | A1 * | 3/2021 | Herbort | C08G 77/045 |

* cited by examiner

SYSTEM AND METHOD TO REMOVE MICRO PLASTIC MATERIAL FROM WATER ENVIRONMENTS

RELATED APPLICATIONS

This application claims the benefit of U.S. Provisional Application No. 62/693,361, entitled "Process for the Removal and Reclamation of PolyEthylene Terephthalate (Micro Plastics) from Marine Water and Ecosystems," and filed on Jul. 2, 2018, which is incorporated herein by reference in its entirety.

Some implementations relate generally to systems and methods for water environment remediation, and more particularly, to systems and methods for collection and removal of micro plastics from water environments or water ecosystems (e.g., oceans, seas, bays, gulfs, lakes, rivers, ponds, or other natural or man-made water environments, etc.).

Plastic is one of the most prevalent types of man-made debris found in marine and freshwater environment. Plastic debris less than five millimeters in length are often referred to as micro plastics, which are thought to potentially be harmful to marine and freshwater ecosystems and environments.

Accordingly, a need may exist for a system and method to remove micro plastics from water environments for remediation of the environment, recycling of the micro plastics, or for other purposes such as micro plastics sample collection for research, etc.

Some implementations were conceived in light of the above mentioned needs and limitations, among other things.

SUMMARY

Some implementations can include a system comprising a flexible volute pipe to siphon untreated water into the system, a screen configured to trap contaminants in the untreated water siphoned by the flexible volute pipe, and a comminutor configured to receive the trapped contaminants from the screen, grind the contaminants to ground particles smaller than a given size, and output a first mixture of water and ground particles. The system can also include one or more primary actuation tanks configured to receive the first mixture from the comminutor, separate any ground particles from water present in the one or more primary actuation tanks, and output ground particles and a second mixture of water and remaining ground particles.

The system can further include one or more secondary actuation tanks configured to receive the second mixture from the one or more primary actuation tanks and to repeat a process of separating any remaining ground particles from water in the second mixture to output ground particles and intermediate water. The system can also include one or more reservoirs each corresponding to one of the one or more primary actuation tanks or the one or more secondary actuation tanks and configured to receive separated ground particles from a corresponding actuation tank.

The system can include one or more storage tanks to receive and hold the ground particles from the one or more reservoirs, an ozone system configured to supply ozone to the one or more storage tanks, and an effluent processing system configured to treat the intermediate water output from the one or more secondary actuation tanks to generate treated water having one or more predetermined physical or chemical parameters, and to release the treated water.

In some implementations, the flexible volute pipe can extend from the system to a water environment to siphon water from the water environment. In some implementations, the flexible volute pipe can be constructed of a permeable material configured to filter organic material from the untreated water prior to the untreated water being siphoned into the system for treatment, and wherein the base of the flexible volute pipe is covered with a mesh. In some implementations, the flexible volute pipe can include one or more transducers mounted on an exterior surface of the flexible volute pipe and configured to measure one or more parameters of the untreated water.

In some implementations, the flexible volute pipe can be constructed to be selectably extendable from a vessel into a water environment to a depth within a range of about 0 ft. to about 5,000 ft. In some implementations, the one or more primary actuation tanks and the one or more secondary actuation tanks can each include a process stack including one or more baffles and one or more boundary layer disks with cavitation inducing structures.

In some implementations, the ozone supplied to the one or more storage tanks can dissolve to mitigate hydrolytic processes and thermal oxidation, and to remove biological contaminants from the separated ground particles. In some implementations, the system can also include a mechanical weir to brush trapped contaminants from the screen for transport to the comminutor.

In some implementations, the comminutor can include a centrifugal comminutor. In some implementations, the one or more primary actuation tanks and the one or more secondary actuation tanks can each include a process stack including one or more baffles and one or more boundary layer disks with cavitation inducing structures, wherein the cavitation inducing structures can include one or more protrusions from the one or more boundary layer disks, and wherein the one or more protrusions can be disposed in one or more rows that extend radially from a central area of the one or more boundary layer disks toward an outer edge of the one or more boundary layer disks.

Some implementations can include a method comprising siphoning untreated water into a system via a flexible volute pipe, and trapping contaminants in the in the untreated water siphoned by the flexible volute pipe using a screen. The method can also include grinding trapped contaminants from the screen using a comminutor configured to receive the trapped contaminants from the screen and grind the contaminants to ground particles smaller than a given size, and output a first mixture of water and ground particles.

The method can further include receiving, at one or more primary actuation tanks, the first mixture from the comminutor, and separating, at the one or more primary actuation tanks, any ground particles from water present. The method can also include outputting, from the one or more primary actuation tanks, ground particles and a second mixture of water and remaining ground particles.

The method can further include receiving, at one or more secondary actuation tanks, the second mixture from the one or more primary actuation tanks, and separating, at the one or more secondary actuation tanks, any remaining ground particles from water in the second mixture to output ground particles and intermediate water. The method can also include receiving, at one or more reservoirs each corresponding to one of the one or more primary actuation tanks or the one or more secondary actuation tanks, separated ground particles from a corresponding actuation tank.

The method can further include storing, at one or more storage tanks, the ground particles from the one or more reservoirs, and supplying ozone to the one or more storage tanks. The method can also include treating the intermediate water at an effluent processing system to generate treated water having one or more predetermined physical or chemical parameters, and releasing the treated water.

The method can also include extending the flexible volute pipe to one or more depths within a water environment, measuring one or more parameters of the water at each of the one or more depths, wherein the measuring is performed by one or more transducers mounted on an exterior surface of the flexible volute pipe, determining a depth to begin collection of untreated water based on the one or more parameters, and initiating siphoning at the determined depth. The method can further include treating the ground particles in the storage tanks in a tertiary treatment process.

The method can also include filtering organic material from the untreated water prior to the untreated water being siphoned into the system. The method can further include selectably extending the flexible volute pipe from a vessel into a water environment to a depth within a range of about 0 ft. to about 5,000 ft.

In some implementations, the one or more primary actuation tanks and the one or more secondary actuation tanks can each include a process stack including one or more baffles and one or more boundary layer disks with cavitation inducing structures. In some implementations, the ozone supplied to the one or more storage tanks can dissolve to mitigate hydrolytic processes and thermal oxidation, and to remove biological contaminants from the separated ground particles.

The method can also include brushing trapped contaminants from the screen using a mechanical weir. In some implementations, the comminutor includes a centrifugal comminutor.

In some implementations, the one or more primary actuation tanks and the one or more secondary actuation tanks each include a process stack including one or more baffles and one or more boundary layer disks with cavitation inducing structures, wherein the cavitation inducing structures include one or more protrusions from the one or more boundary layer disks, and wherein the one or more protrusions are disposed in one or more rows that extend radially from a central area of the one or more boundary layer disks toward an outer edge of the one or more boundary layer disks.

DETAILED DESCRIPTION

In general, some implementations remove large scale amounts of micro plastic water contaminants by treated volume. Some implementations can maintain a neutral (or close to neutral) carbon footprint by employing solar and wind energy generation for powered equipment and processes. A market for the acquired micro plastics, in volume, may be present in multiple industries including, but not limited to, aerospace, structural engineering, architecture, textiles and clothing, etc. Collected and reclaimed micro plastics can be offered as a raw material to industries including those mentioned above.

Prior to initiating a collection and treatment operation as described below, an optional water sample collection and testing phase can be performed. For example, water can be collected from one or more depths and analyzed to determine the state of the water prior to collection and treatment or for other purposes, such as research. The water sample collection and testing phase can include testing the water for one or more parameters such as those shown in Table 1 below.

TABLE 1

| Parameter |
| --- |
| pH |
| Alkalinity |
| Salinity |
| Calcium |
| Magnesium |
| Phosphate |
| Ammonia |
| Silica |
| Iodine |
| Nitrate |
| Nitrite |
| Strontium |
| ORP |
| Boron |
| Iron |
| Temperature |
| B.O.D. |
| Dielectric Strength |

Figure 1:
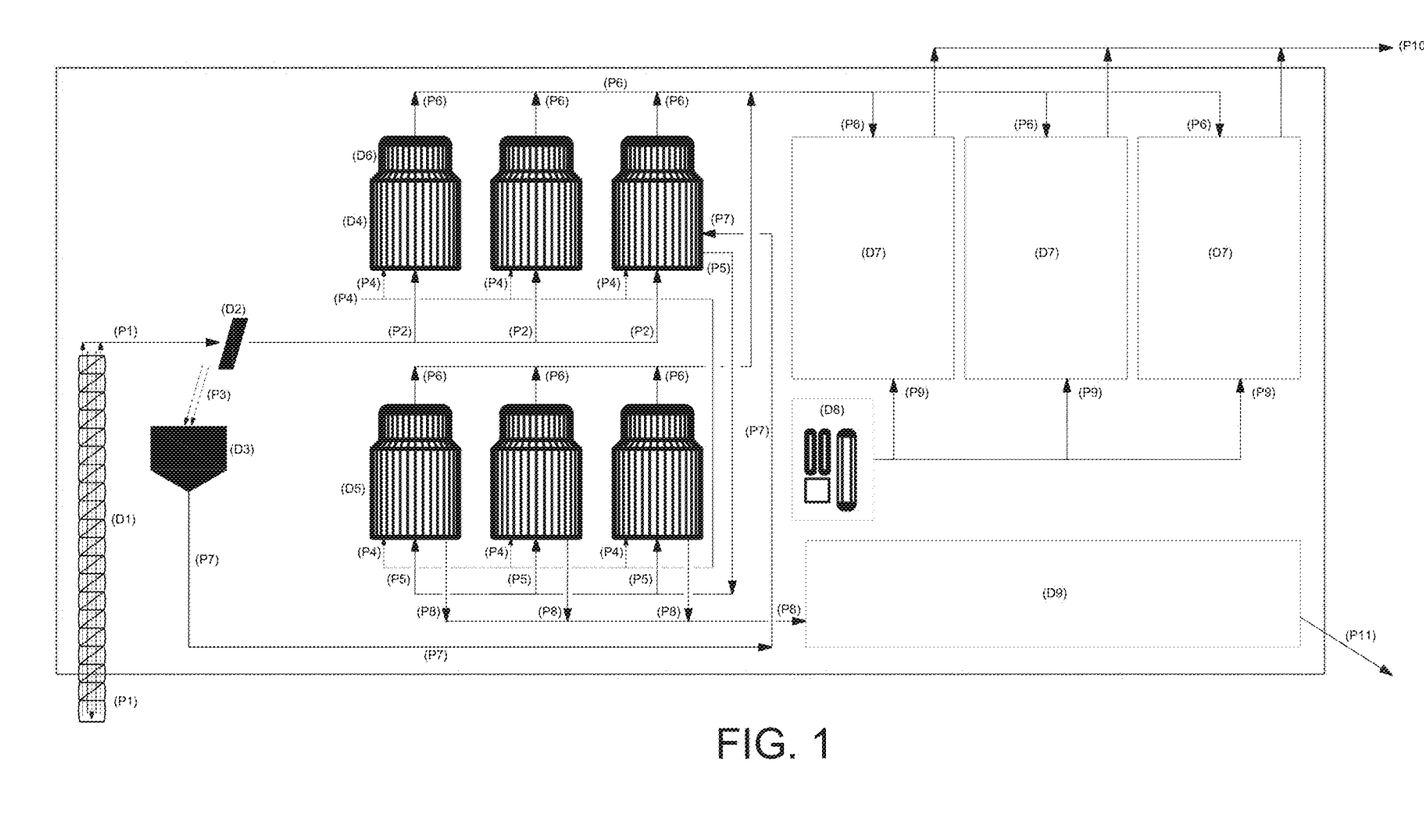
FIG. 1 is a diagram of an example system and process to collect and remove micro plastics from a water environment in accordance with some implementations.

FIG. 1 is a diagram of an example system and process to collect and remove micro plastics from a water environment in accordance with some implementations.

The system includes a flexible volute pipe D1, a screen D2 (e.g., a stainless steel screen), comminutor D3, one or more primary actuation tanks D4, one or more secondary actuation tanks D5, one or more reservoirs D6, one or more storage tanks D7, an ozone system D8, and a refugium D9 (or tertiary treatment system or effluent processing system).

The Method or Process Includes:

P1. Air Injection to extended length of flexible volute pipe (D1) for siphon influent.

P2. Screened water/organic material is pumped to the primary actuation tanks (D4).

P3. Screened inorganic material is moved to the comminutor (D3) and pulverized.

P4. Air is supplied to the primary actuation tanks (D4)

P5. Post primary actuation, water is supplied via gravity flow to secondary actuation (D5).

P6. "Sludge" is pumped to storage tanks (D7).

P7. Comminuted material is moved from comminutor (D3) to the primary actuation tanks (D4).

P8. Treated water is pumped to the Refugium/Tertiary Treatment/Effluent Process (D9).

P9. Ozone from ozone system (D8) is added to micro plastics (e.g., PET/PETE).

P10. PET/PETE moved to off-site processing storage facility.

P11. Effluent is released

Collection Phase

Utilizing a Flexible Volute pipe (FVp) D1 extending from the primary treatment process and through the bottom of the hull, water is siphoned into the screening/pre-treatment process. The FVp D1 is constructed of a flexible and permeable material at 5 micron mesh that will filter 95%+/− 2% of all organic material prior to entering the treatment process. The base of the FVp D1 can be covered with a screen (e.g., a screen having #4 mesh or four openings per inch) to permit larger material to enter the siphon. Optional transducer arrays on the exterior of the FVp D1 can measure fluctuations in water density which varies greatly with higher concentrations of micro plastics (such as PET) from that of uncontaminated water and variations in dielectric strengths (breakdown voltages) above 81 kV/ml listed in Table 2, below.

TABLE 2

| Material | Dielectric Strength (kV/ml) |
|---|---|
| Polyethylene | 18.9 |
| Polyethylene, low density | 21.7-300 |
| Polyethylene, high density | 19.7 |
| Polypropylene/Polyethylene co-polymer | 23.6 |

Once the data is analyzed and a target depth established, the siphon process is initiated. Air is pumped from the primary treatment area into a hose extended with the FVp D1 at varying pressures depending on the depth of the FVp D1. As air is diffused at the lowest depth of the FVp D1, it rises lifting untreated water to the screening/pre-treatment process at a rate of 750-2,700 GPM.

Screening/Pretreatment Phase

Untreated water flows through a screen D2 which is brushed with a mechanical weir. Less than 1% of material contaminants are estimated to be large enough to be caught in the screen. Untreated water that passes through the screen is pumped to the primary treatment process. Those contaminants that are caught in the screen are moved by a mechanical weir to a centrifugal comminutor, collected to a specified capacity, and ground to a given size (e.g., to 5 micron or less size). The ground particles are then moved mechanically to the on-board collection tanks.

Primary Treatment Phase

Stage 1:

From the screening/pre-treatment process, screened water is pumped in to one of three primary actuation tanks D4. Air is supplied to the tank (e.g., at a rate of 720-900 Standard Cubic Feet per Hour (SCFH) per tank) and diffused by an actuation process stack using 27 boundary layer disks with cavitation infusing structure (see, e.g., FIGS. 5A-5C) at the bottom of the tank in to small and microscopic sized bubbles.

Figure 5A:
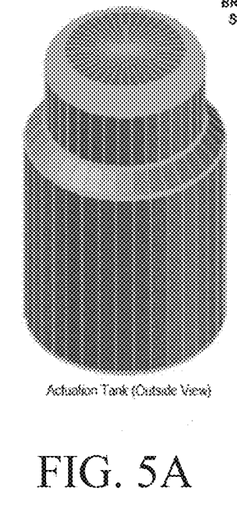
FIGS. 5A-5C are diagrams of an example actuation tank in accordance with some implementations.
Figure 5B:
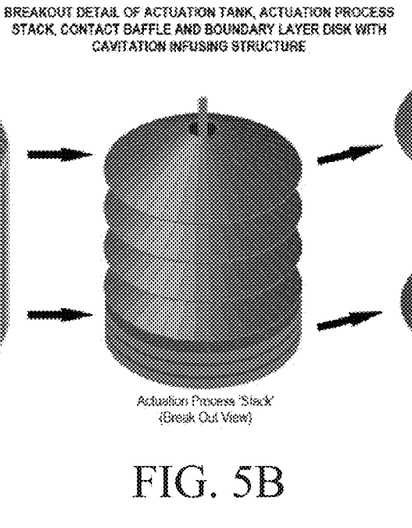
Figure 5C:
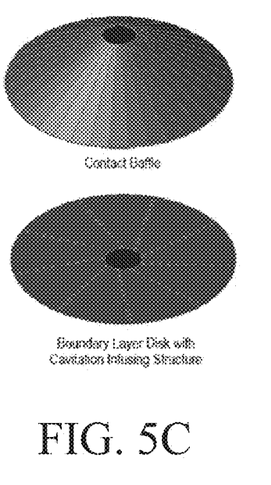

The Actuation Process:

Screened water enters the bottom of the actuation tank and is directed across the edges of the 27 boundary layer disks, causing them to begin rotating. Simultaneously, air is introduced into the actuation tank as described previously.

The rotation of the boundary layer disks accomplishes the following processes: Water moves toward the center of the boundary layer disks, increasing in velocity. The cavitation infusing or inducing structure, oriented in a positive displacement matrix in each of the disks, further breaks down the size of the air bubbles and forces interaction between contaminants and air bubbles. Heavier contaminants move to the outer diameter of the disks and the relatively lighter plastics and other contaminants rise with the air bubbles through the center of the actuation process stack to the contact baffles. Further segregation of lighter contaminants from heavier contaminants, monitoring for any aquatic fauna that may have passed through initial screening, and compression of collected material to remove water happens at this stage of the actuation process By employing both the boundary layer effect in addition to cavitation infusion in a controlled volume, the normally destructive effects due to cavitation are mitigated.

Stage 2:

The bubbles created by the actuation process stack combine rapidly with the water however inorganic material and high density, organic pollutants adhere to the bubbles. As the bubbles rise in the primary actuation tank, they encounter a series of circular baffles that are angled from the inside circumference of the primary actuation tank toward the top of it. This serves two purposes: further accumulation of polymer-based contaminants that may adhere to the side of the tank and increasing the lift pressure moving the now separated contaminants to the reservoir located on top of the actuation tank.

Stage 3:

Once collected in the reservoir (e.g., D6), the aerated material (including micro plastics) may contain less than 3% water. This solution is pumped to one of the three holding tanks.

Stage 4:

Water that has been treated in the primary actuation tanks is gravity fed to one of three secondary actuation tanks D5 where the Venturi process occurs a second time as described above for the primary actuation tanks.

The Venturi process of this system has been modified during to increase flow rate utilizing the boundary layer effect and increase efficiency utilizing principles of cavitation.

Tertiary Treatment Phase

The remaining water in solution will gravity separate from the aerated contaminants in 12-24 hours. The water in this stage is still considered to be contaminated, however, does not require screening/pre-treatment. Rather, it is pumped back to the primary actuation tanks in Primary Treatment.

Considerations for Continuing Decomposition of PET/PETE during End Stage Tertiary Treatment: Polyethylene terephthalate is produced from ethylene glycol and dimethyl terephthalate (C6H4(CO2CH3)2) or terephthalic acid. The former is a transesterification reaction, whereas the latter is an esterification reaction.

Dimethyl terephthalate process

Polyesterification reaction in the production of PET

In dimethyl terephthalate process, this compound and excess ethylene glycol are reacted in the melt at 150-200° C. with a basic catalyst. Methanol ($CH_3OH$) is removed by distillation to drive the reaction forward. Excess ethylene glycol is distilled off at higher temperature with the aid of vacuum. The second transesterification step proceeds at 270-280° C., with continuous distillation of ethylene glycol as well.

The reactions are idealized as follows:
First Step

$C_6H_4(CO_2CH_3)_2 + 2HOCH_2CH_2OH \rightarrow C_6H_4(CO_2CH_2CH_2OH)_2 + 2CH_3OH$ Second Step

$nC_6H_4(CO_2CH_2CH_2OH)_2 \rightarrow [(CO)C_6H_4(CO_2CH_2CH_2O)]_n + n\ HOCH_2CH_2OH$ Terephthalic acid process Polycondensation reaction in the production of PET
Polycondensation Reaction in the Production of PET In the terephthalic acid process, esterification of ethylene glycol and terephthalic acid is conducted directly at moderate pressure (2.7-5.5 bar) and high temperature (220-260° C.). Water is eliminated in the reaction, and it is also continuously removed by distillation $nC_6H_4(CO_2H)_2 + nHOCH_2CH_2OH \rightarrow [(CO)C_6H_4(CO_2CH_2CH_2O)]_n + 2nH_2O$ Degradation Phase PET is subjected to various types of degradations during processing. The main degradations that can occur are hydrolytic, and probably most important, thermal oxidation. When PET degrades, several things happen: discoloration, chain scissions resulting in reduced molecular weight, formation of acetaldehyde.

Mitigation Phase

Figure 4:
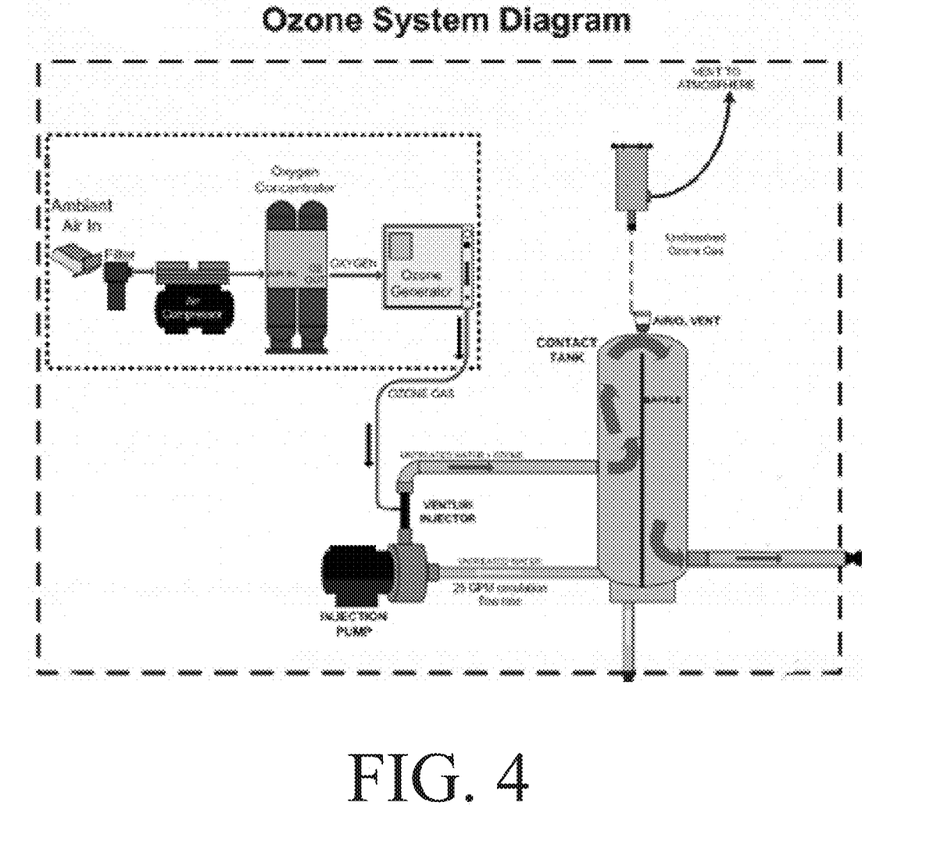
FIG. 4 is a diagram of an example ozone generation system in accordance with some implementations.

This process does not employ photo catalytic filters for degraded component mitigation as their use has the potential to generate formaldehyde, a known carcinogen in humans, from acetaldehyde residual. Rather, dissolved ozone from an ozone system (e.g., FIG. 4) will mitigate hydrolytic process and thermal oxidation as well as remove biological contaminants from the separated PET/PETE volume prior to delivery.

Effluent Phase

Figure 2A:
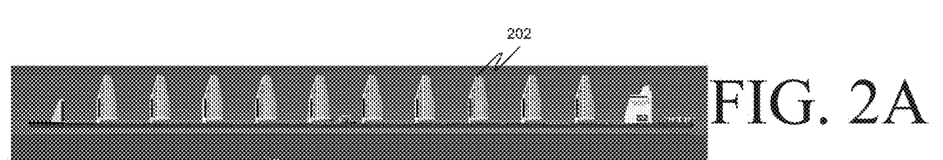
FIGS. 2A-2C are diagrams of an example vessel configured for micro plastic collection and removal in accordance with some implementations.
Figure 2B:
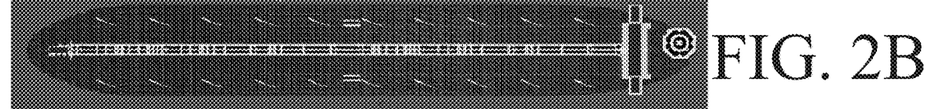
Figure 2C:
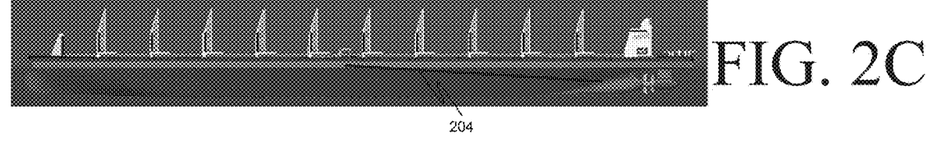
Figure 3:
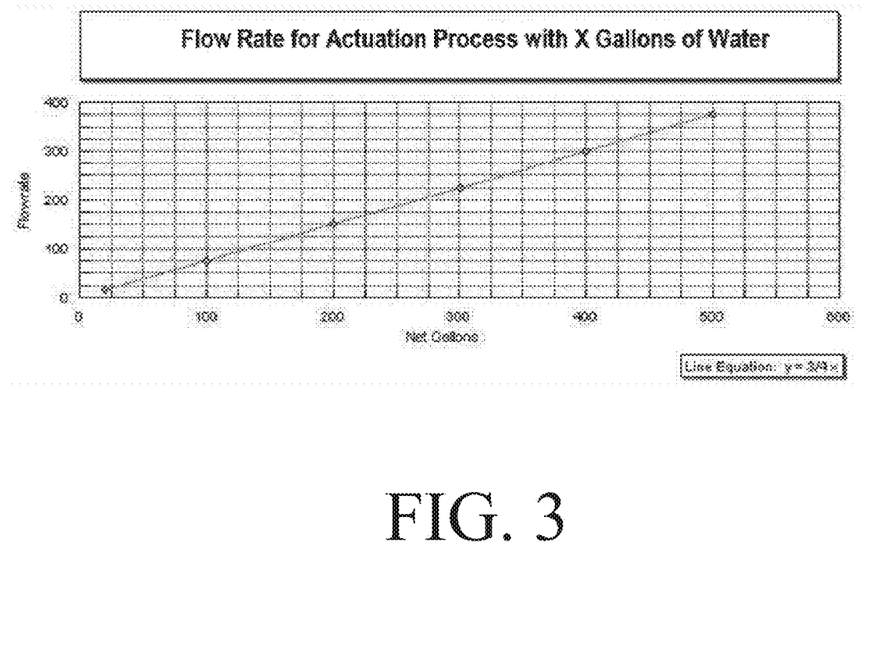
FIG. 3 is an example flow rate chart in accordance with some implementations.

Treated water will be returned (e.g., within +/−5 nautical miles from where the contaminated water influent was siphoned) by means of declination pipes (e.g., example 204 shown in FIG. 2C). This arrangement can help mitigate any flow and/or current anomalies that can typically occur with perpendicular pipes or overflow effluent systems. For example, the effluent processing system can include at least one outlet pipe disposed on a vessel in which the system is installed, the vessel having a length from bow to stern, the pipe having a declination portion generally declining aft over a distance at least one-tenth of the length of the vessel, the declination portion maintaining a downward angle (e.g., between zero degrees and forty-five degrees) over said distance compared to a plane of a deck of the vessel. The distance can vary (e.g., from more or less than one-tenth of the length of the vessel) and the angle can vary (e.g., more or less than forty-five degrees relative to the plane of the deck of the vessel). The outlet pipe can be fully or partially enclosed within the interior of the vessel (e.g., fully or partially enclosed within the outer hull with the outlet pipe opening to the exterior of the vessel near or below the waterline of the vessel). The declining outlet pipe permits the output effluent to be released by reducing or eliminating aeration or oxygenation of the water near the vessel and/or reducing or eliminating damage to any marine life in the effluent or in the water near the vessel.

Testing Phase

Processed water is pumped to a holding tank (e.g., a bow holding tank) where it is tested and monitored prior to effluent for one or more parameters, such as those listed below in Table 3.

TABLE 3

| Parameter | NOAA Recommendation | Typical Surface Ocean Value | Target Actual |
|---|---|---|---|
| pH | 8.1-8.3 | 8.0-8.3 | +/−.2 |
| Alkalinity | 2.5-4 meq/L | 2.5 meq/L | +/−.5% TSOV |
|  | 7-11 dKH | 7 dKH |  |
|  | 125-200 ppm CaCO3 equivalents | 125 ppm CaCO3 equivalents |  |
| Salinity | 35 ppt | 34-36 ppt | Within TSOV range |
|  | 1.026 sg | 1.025-1.027 sg |  |
| Calcium | 380-450 ppm | 420 ppm | +/−.5% TSOV |
| Magnesium | 1250-1350 ppm | 1280 ppm | +/−.5% TSOV |
| Phosphate | <0.03 ppm | 0.005 ppm | TSOV |
| Ammonia | <0.1 ppm | Variable | <0.1 ppm |
| Silica | <2 ppm much lower in areas with high diatom concentration | <0.06-2.7 ppm | Within TSOV range |
| Iodine | Control not recommended | 0.06 ppm total of all forms | NOAA Recommendation |
| Nitrate | <0.02 ppm | Variable | NOAA Recommendation |
| Nitrite | <0.02 ppm | Variable | NOAA Recommendation |
| Strontium | 5-15 ppm | 8 ppm | NOAA Recommendation |
| ORP | Control not recommended | Variable | NOAA Recommendation |
| Boron | <10 ppm | 4.4 ppm | NOAA Recommendation |
| Iron | Below Detection Limits | 0.000006 ppm | NOAA Recommendation |
| Temperature | Variable | Variable | Variable |
| B.O.D. | Variable dependent on region | Variable dependent on region | Variable dependent on region |
| Dielectric Strength | 80-90 kV/ml | 81 kV/ml | NOAA Recommendation |

FIGS. 2A-2C are diagrams of an example vessel configured for micro plastic collection and removal in accordance with some implementations. A vessel can be fitted with solar and wind power generation facilities to maintain a neutral carbon footprint similar to the design shown in FIGS. 2A-2C. For example, a Very Large Crude Carrier (VLCC) class vessel is shown. However, the system and method described herein can be scaled and a vessel suitable to a contemplated scale of the system and method can be used.

In some implementations, boom furling sails 202 and flexible solar arrays at the scale shown in FIGS. 2A-2C can generate approximately 3600 to 6000 kWh/day, which would negate a fossil fuel requirement. The water treatment process may require about 300 kWh/day and the vessel may require about 1,740 kWh/day for optimal efficiency. A 50 amp-hour battery plant with a redundant 50 amp-hour plant which can be be utilized during transit operations between the location(s) of collection/treatment and shore facilities and can supply the power requirements for the vessel with an additional 85-113% of reserve or redundancy.

In some implementations, the hull of the vessel can be of double hull construction per requirements established by International Association of Classification Societies (IACS) Common Structural Rules (CSR) and in accordance with standards established by the American Bureau of Shipping (ABS), for example.

In some implementations, three on-board collection tanks with a total, cumulative capacity of approximately 240,000 cubic meters can be capable of holding up to 1,200,000 metric tons of micro plastics (e.g., Polyethylene Terephthalate or PET). This calculation is based on the micro plastic density being relatively constant. Material density will fluctuate depending on varying concentrations and types of micro plastics and other contaminants.

It will be appreciated that any dimensions mentioned herein are for purposes of illustrating features and operational aspects of the disclosed subject matter and are not intended to be limiting. Other dimensions could be used.

It will also be appreciated that micro plastics removal from a marine environment is described herein as an example application of the disclosed system and method. Some implementations could be applicable to other water environments or ecosystems.

It is, therefore, apparent that there is provided, in accordance with the various embodiments disclosed herein, systems and methods to collect and remove micro plastics from water environments or ecosystems.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system comprising:
a flexible volute pipe to siphon untreated water into the system;
a screen configured to trap contaminants in the untreated water siphoned by the flexible volute pipe;
a comminutor configured to receive the trapped contaminants from the screen, grind the contaminants to ground particles smaller than a given size, and output a first mixture of water and ground particles;
one or more primary actuation tanks configured to receive the first mixture from the comminutor, separate any ground particles from water present in the one or more primary actuation tanks, and output ground particles and a second mixture of water and remaining ground particles;
one or more secondary actuation tanks configured to receive the second mixture from the one or more primary actuation tanks and to repeat a process of separating any remaining ground particles from water in the second mixture to output ground particles and intermediate water;
one or more reservoirs each corresponding to one of the one or more primary actuation tanks or the one or more secondary actuation tanks and configured to receive separated ground particles from a corresponding actuation tank;
one or more storage tanks to receive and hold the ground particles from the one or more reservoirs;
an ozone system configured to supply ozone to the one or more storage tanks; and
an effluent processing system configured to treat the intermediate water output from the one or more secondary actuation tanks to generate treated water having one or more predetermined physical or chemical parameters, and to release the treated water.

2. The system of claim 1, wherein the flexible volute pipe extends from the system to a water environment to siphon water from the water environment.

3. The system of claim 1, wherein the flexible volute pipe is constructed of a permeable material configured to filter organic material from the untreated water prior to the untreated water being siphoned into the system for treatment, and wherein the base of the flexible volute pipe is covered with a mesh.

4. The system of claim 1, wherein the flexible volute pipe includes one or more transducers mounted on an exterior surface of the flexible volute pipe and configured to measure one or more parameters of the untreated water.

5. The system of claim 1, wherein the flexible volute pipe is constructed to be selectably extendable from a vessel into a water environment to a depth within a range of about 0 ft. to about 5,000 ft.

6. The system of claim 1, wherein the one or more primary actuation tanks and the one or more secondary actuation tanks each include a process stack including one or more baffles and one or more boundary layer disks with cavitation inducing structures.

7. The system of claim 1, wherein the ozone supplied to the one or more storage tanks dissolves to mitigate hydrolytic processes and thermal oxidation, and to remove biological contaminants from the separated ground particles.

8. The system of claim 1, further comprising a mechanical weir to brush trapped contaminants from the screen for transport to the comminutor, wherein the comminutor is a centrifugal comminutor.

9. The system of claim 1, wherein the effluent processing system includes at least one outlet pipe disposed on a vessel in which the system is installed, the vessel having a length from bow to stern, the pipe having a declination portion generally declining aft over a distance at least one-tenth of the length of the vessel, the declination portion maintaining a downward angle between zero degrees and forty-five degrees over said distance compared to a plane of a deck of the vessel.

10. The system of claim 1, wherein the one or more primary actuation tanks and the one or more secondary actuation tanks each include a process stack including one or more baffles and one or more boundary layer disks with cavitation inducing structures, wherein the cavitation inducing structures include one or more protrusions from the one or more boundary layer disks, and wherein the one or more protrusions are disposed in one or more rows that extend radially from a central area of the one or more boundary layer disks toward an outer edge of the one or more boundary layer disks.

11. A method comprising:
siphoning untreated water into a system via a flexible volute pipe;
trapping contaminants in the in the untreated water siphoned by the flexible volute pipe using a screen;

grinding trapped contaminants from the screen using a comminutor configured to receive the trapped contaminants from the screen and grind the contaminants to ground particles smaller than a given size, and output a first mixture of water and ground particles;

receiving, at one or more primary actuation tanks, the first mixture from the comminutor; separating, at the one or more primary actuation tanks, any ground particles from water present, outputting, from the one or more primary actuation tanks, ground particles and a second mixture of water and remaining ground particles;

receiving, at one or more secondary actuation tanks, the second mixture from the one or more primary actuation tanks;

separating, at the one or more secondary actuation tanks, any remaining ground particles from water in the second mixture to output ground particles and intermediate water;

receiving, at one or more reservoirs each corresponding to one of the one or more primary actuation tanks or the one or more secondary actuation tanks, separated ground particles from a corresponding actuation tank;

storing, at one or more storage tanks, the ground particles from the one or more reservoirs;

supplying ozone to the one or more storage tanks;

treating the intermediate water at an effluent processing system to generate treated water having one or more predetermined physical or chemical parameters; and releasing the treated water.

12. The method of claim 11, further comprising:

extending the flexible volute pipe to one or more depths within a water environment;

measuring one or more parameters of the water at each of the one or more depths, wherein the measuring is performed by one or more transducers mounted on an exterior surface of the flexible volute pipe;

determining a depth to begin collection of untreated water based on the one or more parameters; and initiating siphoning at the determined depth.

13. The method of claim 11, further comprising treating the ground particles in the storage tanks in a tertiary treatment process.

14. The method of claim 11, further comprising filtering organic material from the untreated water prior to the untreated water being siphoned into the system.

15. The method of claim 11, further comprising selectably extending the flexible volute pipe from a vessel into a water environment to a depth within a range of about 0 ft. to about 5,000 ft.

16. The method of claim 11, wherein the one or more primary actuation tanks and the one or more secondary actuation tanks each include a process stack including one or more baffles and one or more boundary layer disks with cavitation inducing structures.

17. The method of claim 11, wherein the ozone supplied to the one or more storage tanks dissolves to mitigate hydrolytic processes and thermal oxidation, and to remove biological contaminants from the separated ground particles.

18. The method of claim 11, further comprising brushing trapped contaminants from the screen using a mechanical weir.

19. The method of claim 11, wherein the comminutor is a centrifugal comminutor.

20. The method of claim 11, wherein the one or more primary actuation tanks and the one or more secondary actuation tanks each include a process stack including one or more baffles and one or more boundary layer disks with cavitation inducing structures, wherein the cavitation inducing structures include one or more protrusions from the one or more boundary layer disks, and wherein the one or more protrusions are disposed in one or more rows that extend radially from a central area of the one or more boundary layer disks toward an outer edge of the one or more boundary layer disks.

* * * * *